Aug. 12, 1941.  J. C. TROTTER  2,252,534
MOVABLE SUPPORTING DEVICE
Filed April 25, 1940   4 Sheets-Sheet 1

Inventor
JOHN C. TROTTER

Aug. 12, 1941.   J. C. TROTTER   2,252,534
MOVABLE SUPPORTING DEVICE
Filed April 25, 1940   4 Sheets-Sheet 2
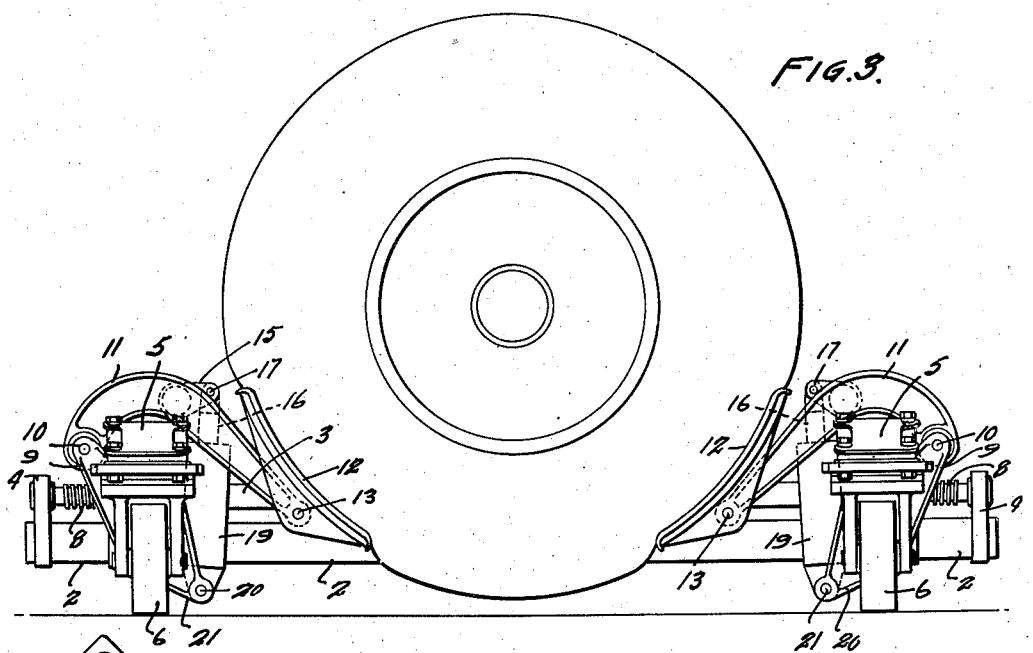
Inventor
JOHN C. TROTTER
By Semmes, Keegin & Semmes
Attorneys

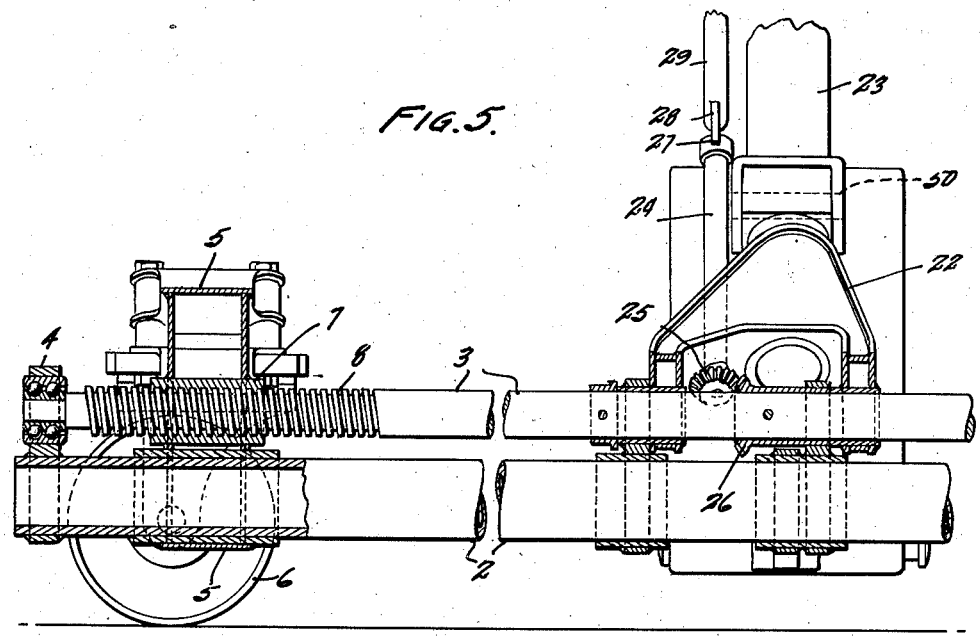
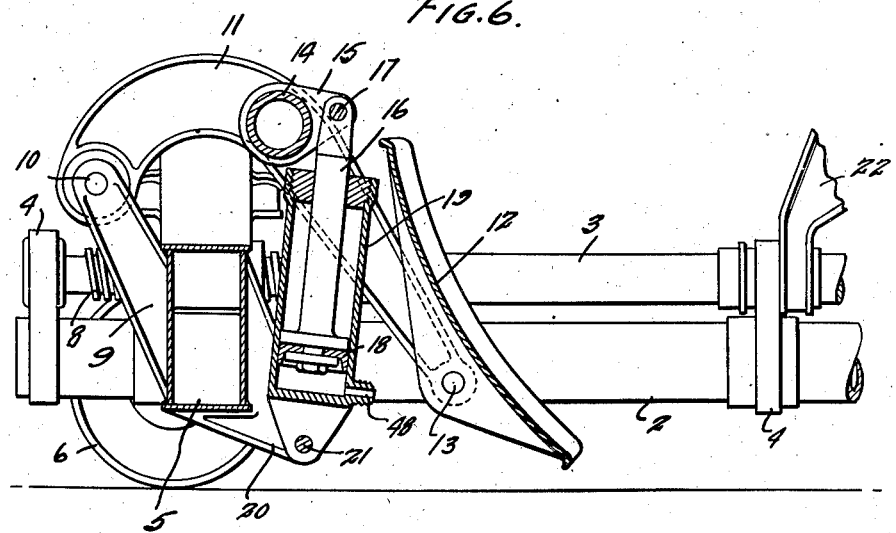

Aug. 12, 1941.  J. C. TROTTER  2,252,534
MOVABLE SUPPORTING DEVICE
Filed April 25, 1940  4 Sheets-Sheet 4

Inventor
JOHN C. TROTTER
By Semmes, Keeping & Semmes
Attorneys

Patented Aug. 12, 1941

2,252,534

UNITED STATES PATENT OFFICE

2,252,534

MOVABLE SUPPORTING DEVICE

John C. Trotter, Buffalo, N. Y., assignor to Bell Aircraft Corporation, Buffalo, N. Y., a corporation of New York Application April 25, 1940, Serial No. 331,615

10 Claims. (Cl. 254—2)

The present invention relates to a movable supporting device, and more particularly to a dolly to be used in parking airplanes in confined or restricted areas such as, on aircraft carriers, in hangers, etc. Of course, the scope of my invention is not thus limited, since the dolly can be employed to park automobiles in garages, for instance.

It is well recognized that the parking of airplanes on an aircraft carrier is very difficult by virtue of the restricted space. Much trouble has been encountered in parking airplanes by reason of the non-swiveling mounting of the main landing wheels to the body of the airplane, and particularly in removing a single plane from the parked line.

The present practice, therefore, is undesirable for several reasons, among which are the following, first, it reduces materially the number of planes that can be conveniently handled on an aircraft carrier; second, it consumes a large amount of time in getting the plane into its parked position, and; third, it will not permit the easy removal of a plane from its parked position in the line to the runway for take-off.

As far as I know, there has never been proposed any feasible method that will enable planes to be parked in areas such as above mentioned that will not be open to the foregoing and other disadvantageous features. The present invention was devised to overcome the above defects and to provide a construction by which an airplane can be easily and quickly placed into or removed from the line.

One object of my invention is to provide a spotting dolly that will enable airplanes or the like to be parked in restricted areas that is quickly operated and that is adjustable for use with different sizes of airplanes.

Yet another object of this invention is to provide a dolly for use on aircraft carriers that will permit airplanes to be parked much closer than was heretofore possible.

A still further object of my invention is to provide a spotting dolly for aircraft which can be inexpensively manufactured, which is highly efficient and quick in operation and which is collapsible so as to take up a minimum of stowage space.

To accomplish the foregoing and other objects, this invention comprises a wheeled truck that carries gripping means to hold the tire of the landing wheel of the airplane. Manually operated means is provided to adjust the gripping means to permit the truck to be used with all sizes of airplanes. The tire gripping means is pivotally mounted to the truck and a fluid operating lifting device is associated therewith to cause pivoting of the gripping means to elevate the landing wheel.

The gripping means is so pivoted to the truck that there is progressively less squeezing of the tire and more raising action on the tire as the pivoting to elevate the wheel continues. The fluid operated device is actuated by manipulating a handle carried by the truck until the wheel is raised clear of the ground and the wheel is lowered by merely opening a valve in the fluid system.

In operation, a truck or dolly is wheeled up to each of the main landing wheels of the plane and the gripping means of each dolly is engaged on the respective tires. After the gripping means has been adjusted to fit the tires, the operator pumps the handle provided on the truck which causes the gripping means to be pivoted, thus raising the wheel from the supporting surface of the aircraft carrier. The plane is then resting on the caster wheels of the dolly and as the tail wheel of the aircraft is castered, the plane may be moved at 90° or any other angle to the normal path, thus enabling the plane to be moved laterally into its space in the line. After the plane has been parked, a valve is opened which permits the gripping means to descend until the landing wheels of the plane again rest on the supporting surface. The operating means for the gripping means is then manipulated to free the gripping means from the tire and each dolly is removed from its respective landing wheel.

In the drawings in which like numerals indicate the same or similar parts:

Figure 3 is a view similar to Figure 1 showing the wheel in raised position.

Figure 4 is an end view showing the operating handle in its folded position in dot and dash lines.

Figure 5 is a sectional view taken along the line 5—5 of Figure 4.

Figure 6 is a sectional view taken along the line 6—6 of Figure 2.

Figure 1:
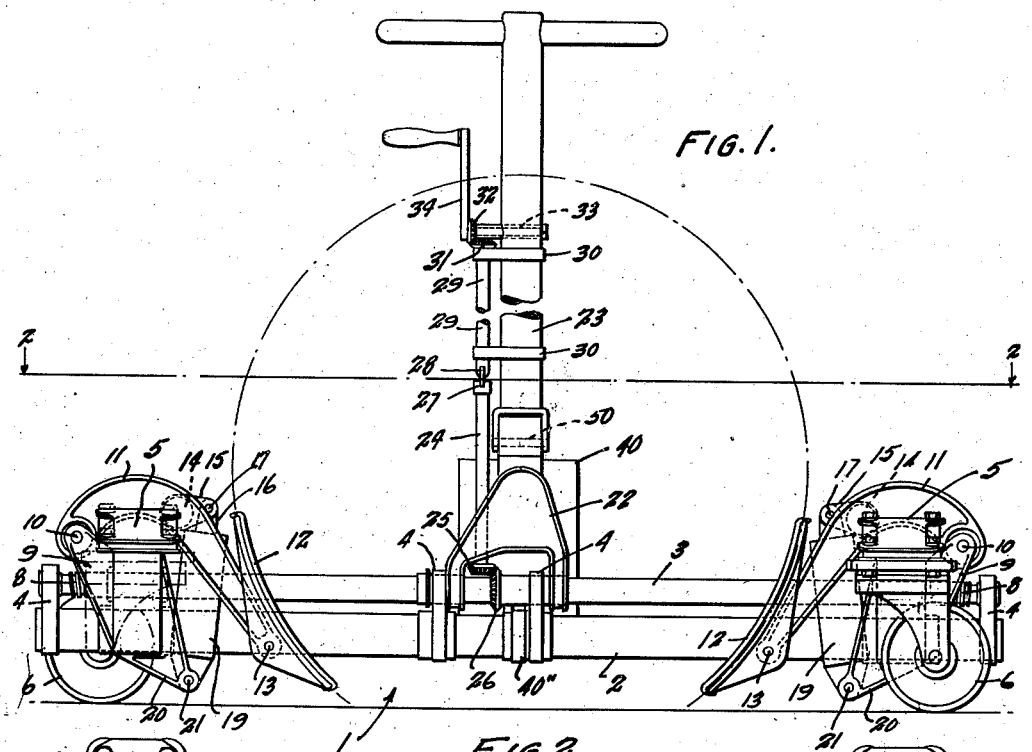
Figure 1 is a side elevational view of my novel spotting dolly.

My novel dolly construction, as shown in Figure 1, consists of a wheeled frame indicated generally 1 which comprises a horizontal tube 2 and a screw member 3 is journaled in parallel spaced relation thereto by radial arms 4. Slidably mounted on the tube 2 at each end thereof is a transverse, light-weight, sturdy frame 5, provided at each extremity thereof with a caster wheel 6.

Figure 2:
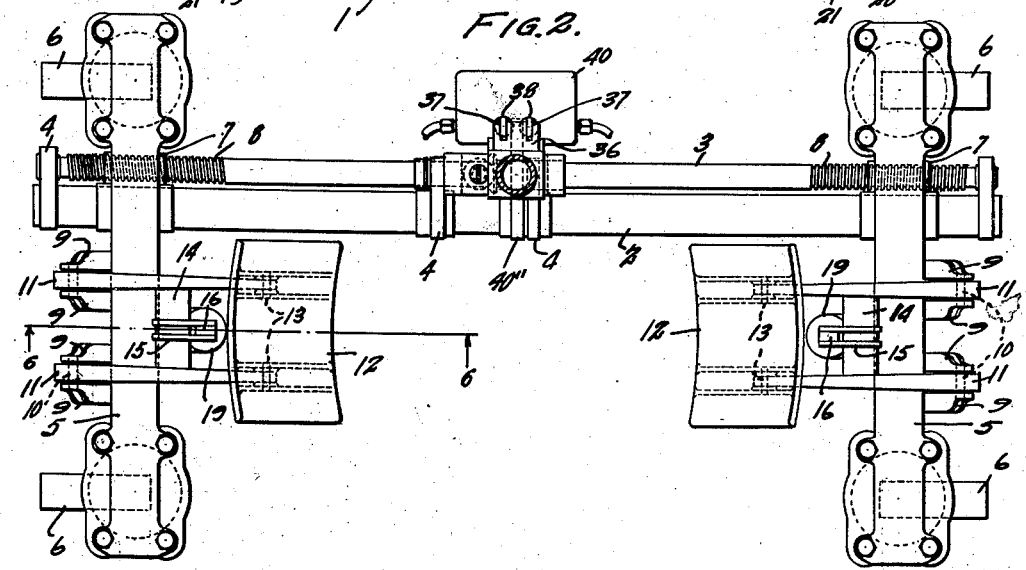
Figure 2 is a sectional view taken along the line 2—2 of Figure 1.

Each caster frame 5 carries a nut 7 which is in screw-threaded engagement with oppositely threaded ends 8 of the screw member 3. Pivotally attached to brackets 9 carried by each frame 5 at 10 are a pair of gooseneck arms 11. A shoe 12 is pivoted at 13 to the lower ends of the arms (Figure 2). As shown in Figures 2 and 6, each pair of arms 11 is joined by a cross tube 14 which carries lugs 15, and the end of a piston rod 16 is pivoted thereto, as shown at 17. The piston rod 16 has a piston head 18 which moves in a cylinder 19. The lower end of the cylinder 19 is pivotally attached to a bracket 20 secured to the frame 5, as shown at 21.

Mounted to rotate on the screw 3 is a yoke 22 to which is swingably attached an operating handle 23 that is adapted to be fixedly secured in line with the yoke by any suitably locking means. Journaled in the yoke and extending parallel thereto is a shaft 24, the lower end of which carries a bevel pinion 25 that meshes with a bevel gear 26 secured to the screw 3. The opposite end of the shaft 24 has a slot 27 that engages a key 28 on one end of a second shaft 29 that is journaled in brackets 30 attached to the handle 23. The upper end of the shaft 29 carries a miter gear 31 that meshes with a miter gear 32 on a stub shaft 33 journaled in the handle 23. An operating crank 34 is secured to the stub shaft 33, and as a consequence, rotation of the crank will impart rotary movement to the screw 3 through the above described gearing and cause each caster frame 5 to move toward or away from each other along the horizontal tube 2.

Figure 7:
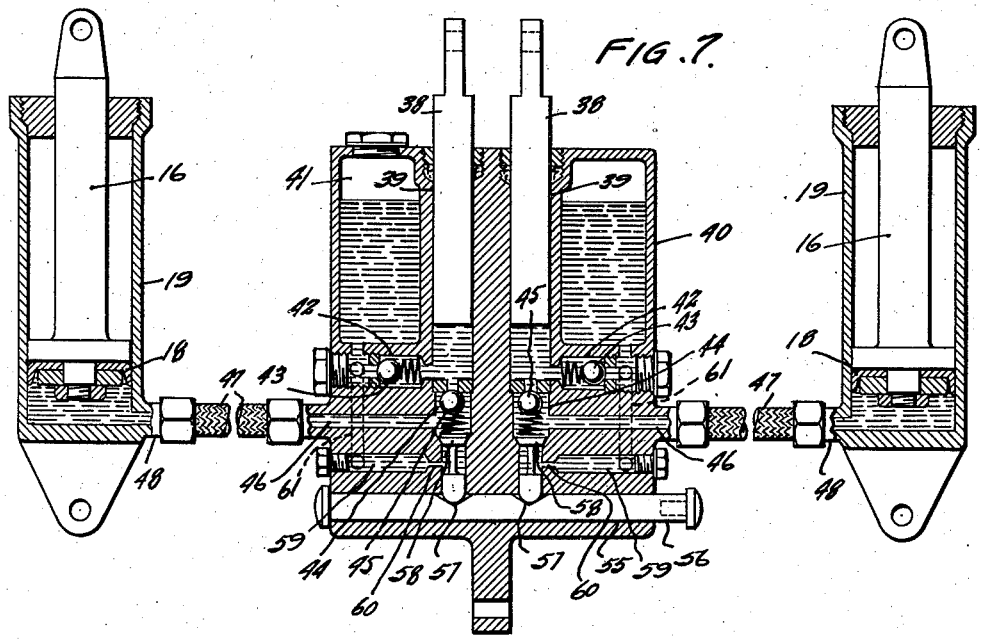
Figure 7 is a diagrammatic view in transverse section of the hydraulic wheel raising system.

As best shown in Figure 4, the yoke 22 has an extension 36 which is slotted as shown at 37. Pivotally connected in each slot 37 are reduced ends of a pair of small pistons 38 which reciprocate in cylinders 39 formed in a hydraulic pump unit 40 which is adjustably pivoted as at 40' to an offset arm 40'' integral with the tube 2. It can be seen in Figure 7 that the pump 40 is provided with a fluid reservoir 41 for the cylinders 39 that communicates with the cylinders through ducts 42 in which are disposed ball check valves 43. Positioned below each cylinder 39 in a bore 44 is a second ball check valve 48. Each bore 44 is in communication with a horizontal passage 46. A flexible conduit 47 is detachably secured to the outlet of each passage 46 and the opposite end thereof is secured to a nipple 48 provided on the cylinders 19 at the lower end thereof. It will be appreciated, therefore, from the above description that the pump unit 40 is in communication with each cylinder 19 associated with the arm 11 and its shoe 12.

The handle 23 is pivoted to the yoke as shown at 50 and is rigidly secured thereto by a locking device 51.

When the handle 23 is pumped, fluid from the reservoir 41 will be sucked into the cylinders 39 on the up stroke of the pistons and be forced past check valves 45, into the passages 46, through conduits 47, and into each cylinder 19 on the down stroke. It is apparent, therefore, that the fluid in the cylinder 19 will move the piston rod 16 upwardly, and by virtue of its attachment to the arms 11, the shoe 12 will be moved upwardly about the pivot point 10, thus elevating the wheel.

In order to lower the pistons 16, it will be seen that the pump unit 40 is formed with a longitudinal bore 55 in which slides a rod 56. The upper edge of the rod is formed with notches 57 into which fit the lower ends of mushroom valves 58 mounted in the bores 44 below the check valves 45. The lower portion of each bore 44 communicates with a passage 59 through a restricted orifice 60. A vertical passage connects each passage 59 with the reservoir 41. By moving the bar 55 to a position where the lower ends of the valves 58 will be moved out of the notches 57, the valves will be raised from their seats and the fluid from the cylinders 19 may be returned to the reservoir 41 through the restricted orifices 60. It will be appreciated that by virtue of the restricted orifice 60, the pistons 16 will descend slowly in their cylinders, and there can be no jarring or sudden shock imparted to the airplane.

By actuating the locking device 51, the offset portion 36 which carries the operating handle 23 is free to be moved about its pivot 50 to the folded position shown in the dot-dash lines, and as a result, the dolly does not take up much space and can be conveniently stored.

Figure 8:
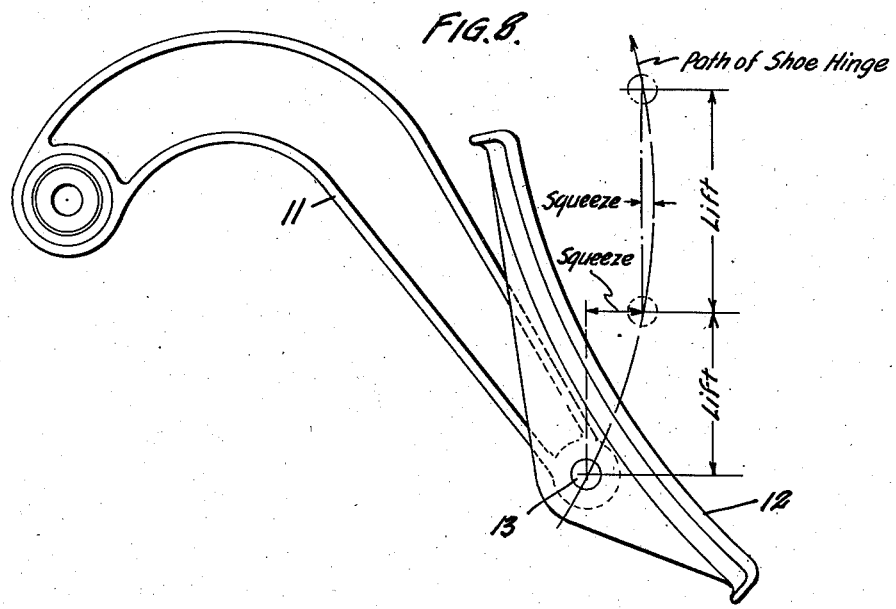
Figure 8 is a diagrammatic view illustrating the movement of the shoe in raising the wheel.

In operation, each frame 1 is moved up to the landing wheels of the airplane. The shoes 12 are adjusted by means of the crank 34 until they engage the outer periphery of the tire as shown in Figure 1. The operator then actuates the handle 23 to operate the pump unit 40 and the fluid will be forced into each cylinder 19, thus moving the piston 16 therein and pivot the arms 11 and shoe 12 about the point 10. In Figure 8, it will be observed that when the shoe reaches the point where it is approximately horizontal with the point of pivoting 10 that there is practically little or no squeezing of the tire but considerable lift is imparted to it, or, in other words, the arms 11 are so pivoted to the caster frame 5 that there is progressively less squeezing and more elevating action on the tire as the pivoting of the arm continues.

After the wheel has been elevated to a point where it is clear of the supporting surface, the airplane will be resting on the casters 6. In view of the fact that the tail wheel of the plane is also castered, the airplane may be moved at any angle, and as a result, it is a relatively simple matter to park the airplane in a restricted area.

After the airplane has been parked and it is desired to remove each dolly from the landing wheels, the bar 55 is moved so that the valves 58 will open and the fluid in the cylinders 19 will then flow back into the oil reservoir 41. However, due to the restricted orifice 60, the arms 11 and the shoes 12 will descend slowly, thus preventing any shock from being imparted to the ship, which is highly desirable. When the tires of the landing wheels again contact the supporting surface, the crank 34 is manipulated to move the shoes 12 out of engagement with the tires and each dolly can then be wheeled away from the airplane.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A spotting dolly of the type adapted for movement in all directions on a supporting surface comprising a frame, arms pivoted to the frame, shoes pivoted to the arms and adapted to contact a wheel, means to move the pivoted arms to cause the shoes to contact the wheel, and means to pivot the arms and shoes to raise the wheel.

2. In a spotting dolly for raising the wheel of a vehicle, a support, arms pivoted to the support, shoes pivoted to the arms and adapted to contact a wheel, screw adjustment means to cause initial contact of the shoes with the wheel, and fluid operating means to cause pivoting of the arms to raise the wheel.

3. In a spotting dolly for raising the wheel of a vehicle, a support, arms pivoted to the support, shoes pivoted to the arms and adapted to contact a wheel, screw adjustment means to cause initial contact of the shoes with the wheel, and fluid operating means to cause pivoting of the arms to raise the wheel, said arms being pivoted to the support in substantially the plane of maximum elevation of the shoe whereby there is a decreasing amount of gripping on the wheel with a corresponding increase in lift to the wheel.

4. A spotting dolly of the type adapted for movement in all directions on a supporting surface comprising a frame, arms pivoted to the frame, shoes pivoted to the arms and adapted to contact a wheel, a cylinder pivoted to the frame, a piston movable in the cylinder, the piston being attached to the arms, and means to cause said piston to move whereby the arms are pivoted to elevate the wheel.

5. A spotting dolly of the type adapted for movement in all directions on a supporting surface comprising a support, a frame carried at each end of the support and slidable thereon, arms pivoted to each frame, shoes pivoted to the arms and adapted to contact a wheel, means to slide said frames whereby the shoes will engage the wheel, a cylinder pivoted to each frame, pistons movable in the cylinders, the pistons being attached to the arms, and means to admit fluid into the cylinders to cause the pistons to move the arms on their pivots to elevate the wheels.

6. A spotting dolly of the type adapted for movement in all directions on a supporting surface comprising a frame, arms pivoted to the frame, shoes pivoted to the arms and adapted to contact the wheel, and means to pivot the arms to elevate the wheel, said arms being pivoted to the frame in substantially the plane of maximum elevation of the shoe whereby there is a decreasing amount of squeeze on the wheel with a corresponding increase in lift to the wheel.

7. In a spotting dolly for raising the wheel of a vehicle, a support, combined gripping and raising means for the wheel pivoted to the support, said gripping and raising means being pivoted to the support in substantially the plane of maximum elevation of the said means whereby there is a decreasing amount of gripping on the wheel with a corresponding increase in lift to the wheel, and devices to actuate said gripping and raising means.

8. In a spotting dolly for raising the wheel of a vehicle, a support, combined wheel gripping and raising devices pivoted to the support, and means to move said gripping and raising devices to grip the wheel, the point of pivoting of said combined wheel gripping and raising devices to the support being so disposed that there is more gripping than raising action at the first part of the pivoting, and less gripping and more raising action at the latter part of the pivoting.

9. In a spotting dolly for raising the wheel of a vehicle, a support, combined wheel gripping and raising means pivoted to the support, and screw operated means to move said combined wheel gripping and raising means to grip the wheel, the point of pivoting of the wheel gripping and raising means to the support being in substantially the plane of maximum elevation of the said means whereby there is a decreasing amount of gripping on the wheel with a corresponding increase in lift to the wheel.

10. In a spotting dolly for raising the wheel of a vehicle, a support, arms pivoted to the support, shoes pivoted to the arms and adapted to contact a wheel, and means to move the arms and shoes to a position to grip the wheel, the point of pivoting of the arms to the support being in substantially the plane of maximum elevation of the shoe whereby there is a decreasing amount of gripping on the wheel with a corresponding increase in lift to the wheel.

JOHN C. TROTTER.